(12) United States Patent
Sakai et al.

(10) Patent No.: US 7,619,667 B2
(45) Date of Patent: Nov. 17, 2009

(54) SOLID-STATE IMAGE DEVICE AND CAMERA INCLUDING SOLID-STATE IMAGE DEVICE FOR SELECTIVE OUTPUTS

(75) Inventors: Seiichirou Sakai, Zuma (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 11/272,190

(22) Filed: Nov. 10, 2005

(65) Prior Publication Data

US 2006/0109360 A1    May 25, 2006

(30) Foreign Application Priority Data

Nov. 19, 2004   (JP)   ............... 2004-335400

(51) Int. Cl.
  *H04N 9/64*   (2006.01)
  *H03F 3/00*   (2006.01)
  *H04N 5/335*  (2006.01)
  *G06F 3/041*  (2006.01)

(52) U.S. Cl. ............... 348/243; 348/282; 330/11; 345/173

(58) Field of Classification Search .............. 348/300, 348/301, 243–245, 282, 311; 250/208.1; 345/173; 330/11
See application file for complete search history.

(56) References Cited

U.S. PATENT DOCUMENTS 5,278,656 A    1/1994   Hynecek

FOREIGN PATENT DOCUMENTS

| JP | 6-189065 | 7/1994 |
| JP | 7-075024 | 3/1995 |
| JP | 9-163218 | 6/1997 |
| JP | 2001-094887 | 4/2001 |

*Primary Examiner*—Jason Chan
*Assistant Examiner*—Joel Fosselman
(74) *Attorney, Agent, or Firm*—Canon U.S.A., Inc. I.P. Division

(57) ABSTRACT

A solid-state image device including pixels arranged two-dimensionally, the pixels each including a photoelectric converter for converting incident light into an electric signal, is provided. The solid-state image device includes an output amplifier configured to amplify a photoelectric conversion output from each of the pixels, and a reference voltage amplifier configured to output a reference voltage. The solid-state image device selectively outputs the photoelectric conversion output and the reference voltage.

7 Claims, 9 Drawing Sheets

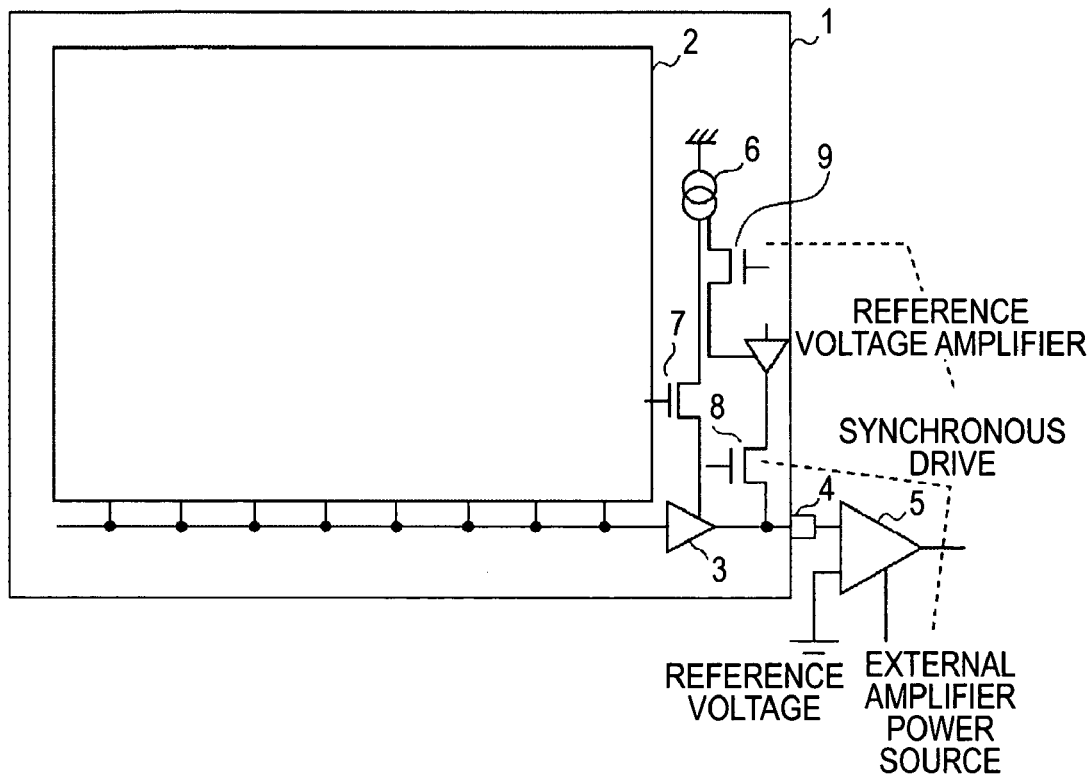

|  | CURRENT CONSUMPTION | ACCUMULATION TIME APPROX. 1 SEC. POWER-SAVE MODE 1 | ACCUMULATION TIME APPROX. 5 SEC. POWER-SAVE MODE 2 | ACCUMULATION TIME MORE THAN 10 SEC. POWER-SAVE MODE 3 |
|---|---|---|---|---|
| OUTPUT AMPLIFIER | LARGE | OFF | OFF | OFF |
| REFERENCE VOLTAGE AMPLIFIER | MEDIUM | ON | OFF | OFF |
| CURRENT SOURCE | SMALL | ON | ON | OFF |

| OUTPUT VOLTAGE | ✕ | REFERENCE VOLTAGE | REFERENCE VOLTAGE | REFERENCE VOLTAGE |
|---|---|---|---|---|
| EXTERNAL AMPLIFIER | ✕ | OFF | OFF | OFF |

FIG. 11 --Prior Art--
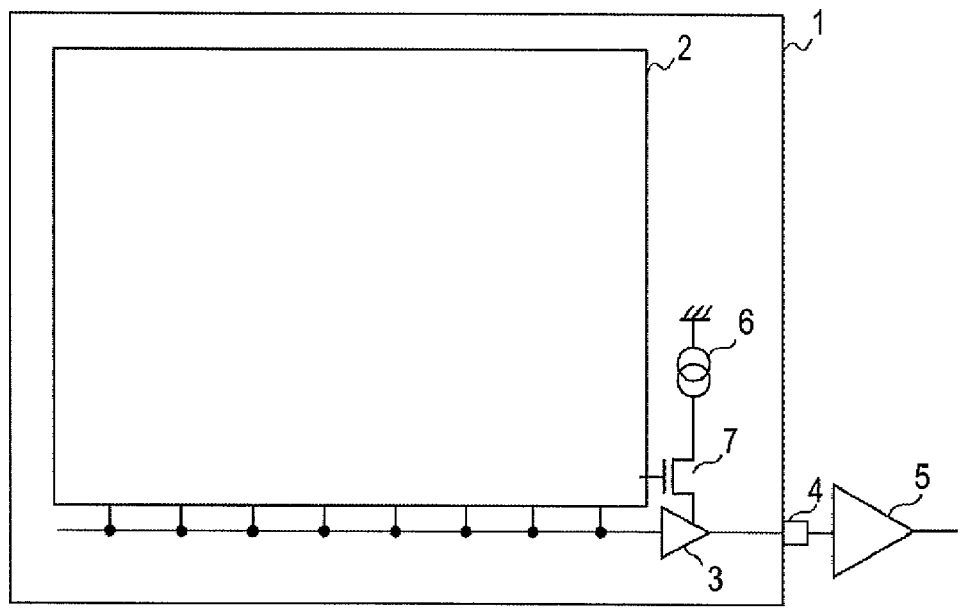
FIG. 12 --Prior Art--
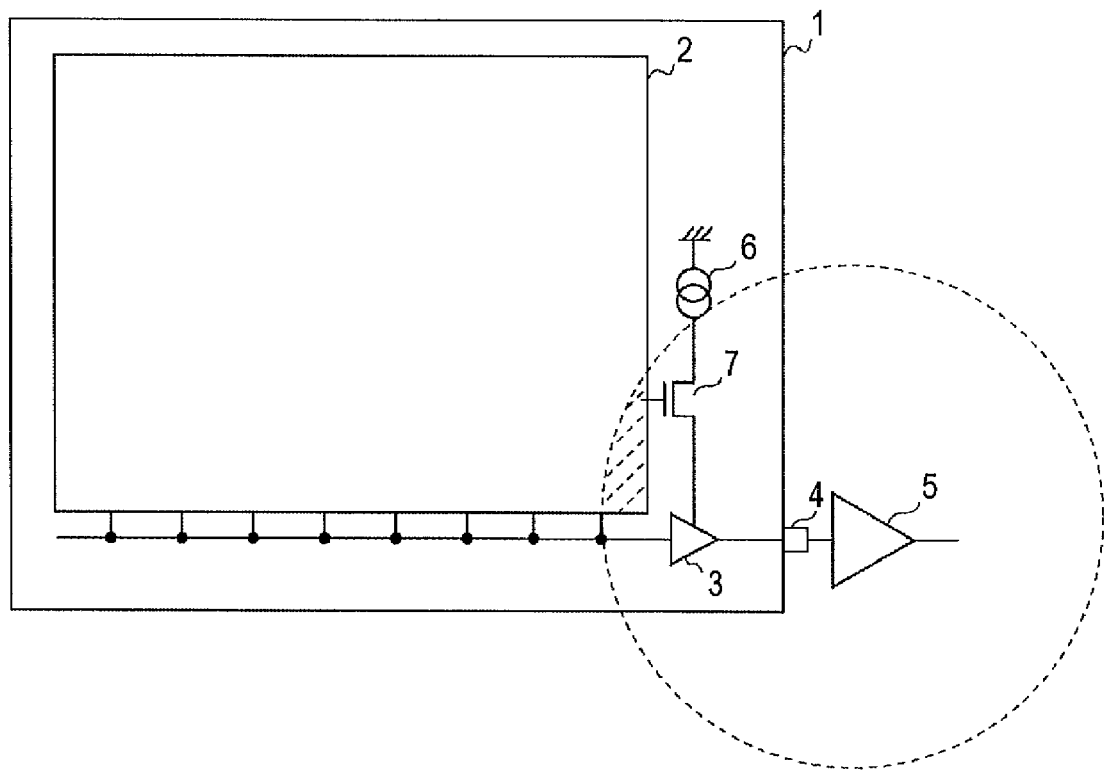

FIG. 13  --Prior Art--
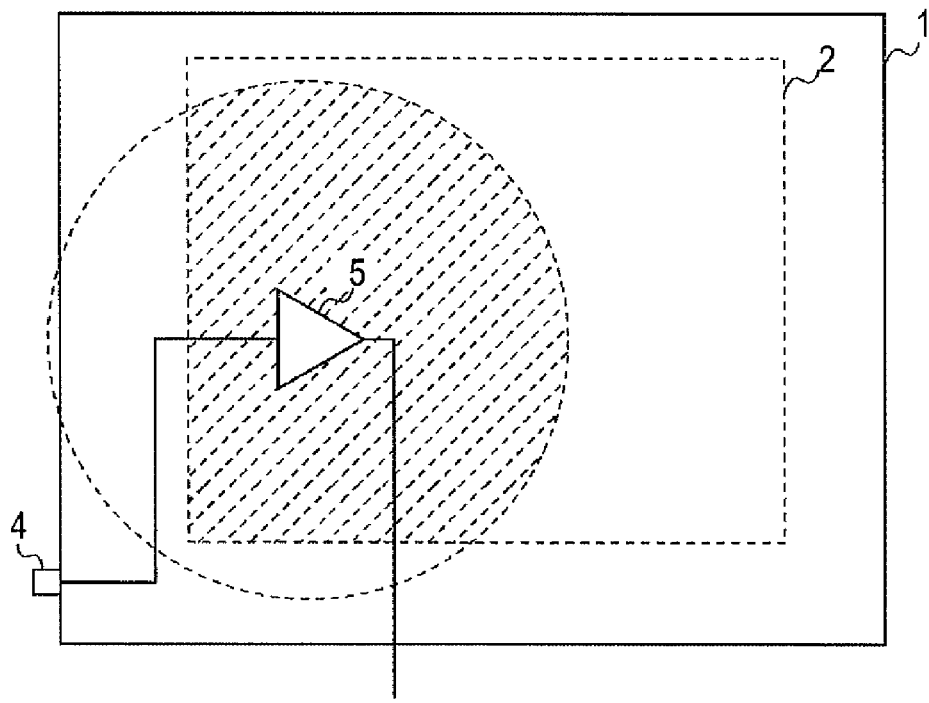
FIG. 14  --Prior Art--
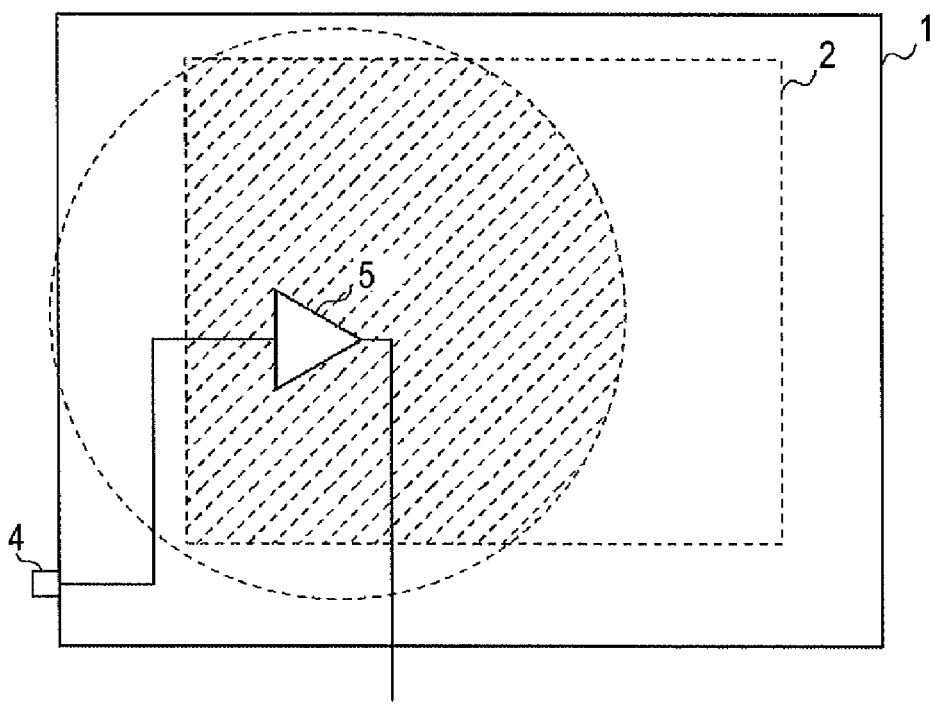

FIG. 15 --Prior Art--
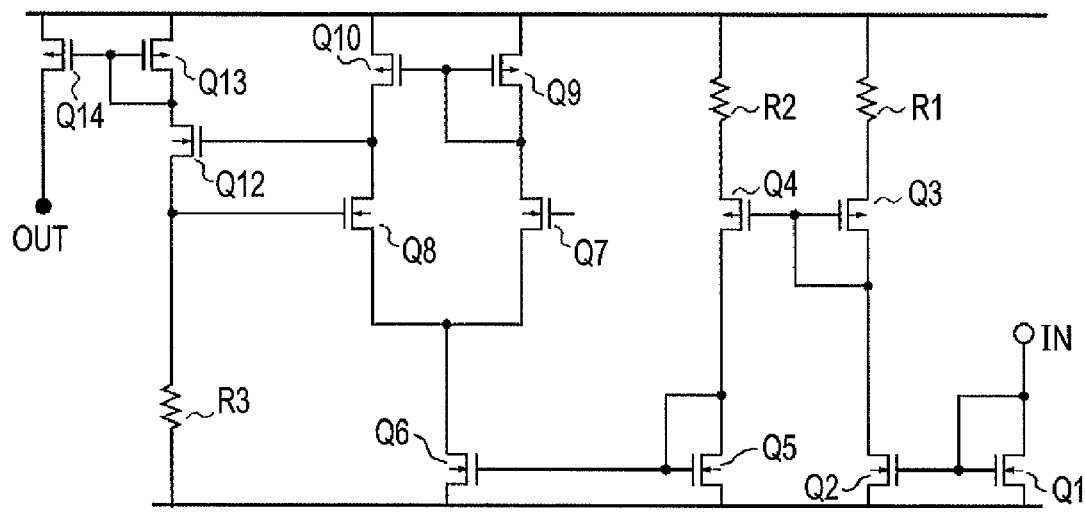
FIG. 16 --Prior Art--
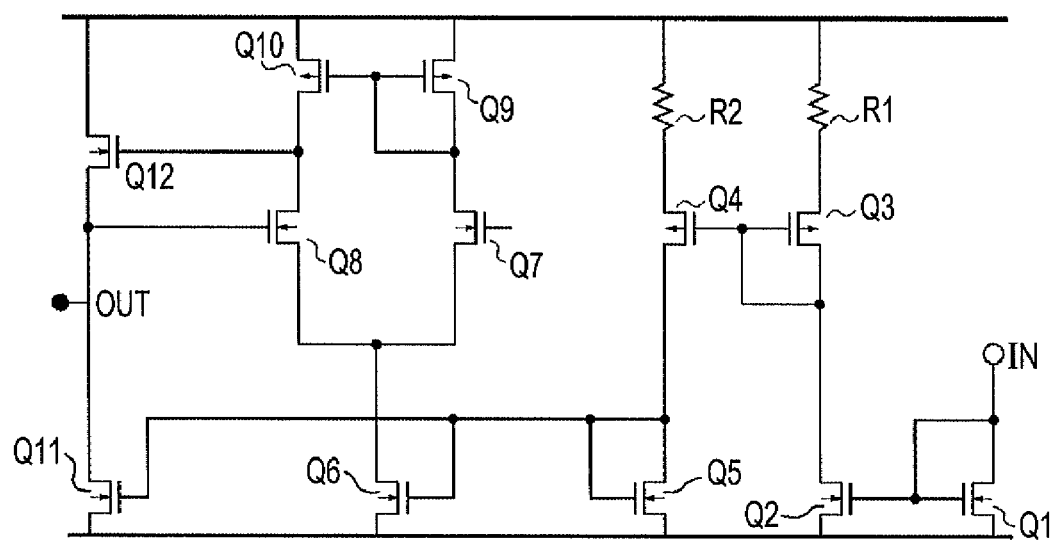

SOLID-STATE IMAGE DEVICE AND CAMERA INCLUDING SOLID-STATE IMAGE DEVICE FOR SELECTIVE OUTPUTS

BACKGROUND OF THE INVENTION

1. Field of the Invention

The present invention relates to solid-state image devices including a plurality of photoelectric converters for converting incident light into electric signals.

2. Description of the Related Art

In image pickup apparatuses, such as digital cameras including a solid-state image device, in order to make signal outputs of the solid-state image device more tolerant to disturbance noise, an external amplifier is disposed in close vicinity to the solid-state image device and amplifies the outputs. This structure will be described with reference to FIG. 11. Reference numeral 1 denotes a solid-state image device. Pixels each including a photoelectric converter are arranged two-dimensionally in a pixel area 2. An output amplifier 3 outputs signals of the pixels. An external amplifier 5 is disposed near an output terminal 4. Reference numeral 6 denotes a current source of the output amplifier 3. A power-save switch 7 switches the current consumption of the output amplifier 3. Switching the current consumption of the output amplifier 3 using the power-save switch 7 suppresses an increase in the dark current of a photoelectric converter located near the output amplifier 3, the increase being caused by heat generation of the output amplifier 3.

In addition, Japanese Patent Laid-Open No. 6-189065 discloses an image sensor including an output amplifier provided with a power-save mode.

For digital cameras, since waste of batteries depends on current consumption, reduction in the current consumption is considered in terms of increasing battery longevity.

However, due to the recent advancement of technologies, the signal-to-noise ratio of signal outputs have been improved, and new technological problems have occurred. In other words, when long-time accumulation over several seconds for astronomical photographs or the like is performed, nonuniformity of dark currents occurs due to heat generation or light emission of the internal amplifier and the external amplifier. In particular, when an external amplifier is disposed outside a sensor chip (solid-state image device) and near the solid-state image device, since the external amplifier generates heat, an output of a photoelectric converter located near the external amplifier increases due to a dark current. Thus, a problem in which dark current nonuniformity occurs on a screen, which is unique to solid-state image devices, occurs. This problem is more severe than maintaining known battery longevity. This is because an extremely long time, such as several minutes or several tens of minutes, is required for accumulation.

More specifically, when the temperature of a portion of the pixel area 2 near the external amplifier 5 increases by one degree due to heat generation of the internal amplifier and the external amplifier, a dark current nonuniformity of approximately 10% occurs. FIG. 12 shows generation of dark current nonuniformity. As shown in FIG. 12, a pixel output in an oblique line portion of the pixel area 2 increases due to heat generation of the external amplifier 5. This problem has a large effect on the quality of an image. FIG. 13 shows a case where the external amplifier 5 is mounted on the rear face of a package of the solid-state image device 1. Since the external amplifier 5 is mounted on the backside of the pixel area 2, an influence of dark current nonuniformity due to heat generation further increases. FIG. 14 shows another case where the external amplifier 5 is mounted on the rear face of the package of the solid-state image device 1. Since the package of the solid-state image device 1 is made of ceramics, a high thermal conductivity is achieved and an influence of dark current nonuniformity is increased.

In addition, for the internal amplifier, depending on the operation voltage of a transistor used, dark current nonuniformity occurs even when a current of several tens of microamperes flows. This is because a slight amount of infrared light is generated in the transistor due to an impact ionization phenomenon. In other words, only reducing currents, such as simply turning off a constant-current source, cannot prevent nonuniformity. This problem cannot be handled by known ideas.

In addition, when the power sources of the internal amplifier and the external amplifier are simply turned off during an accumulation time in order not to generate dark current nonuniformity, a phenomenon, such as an output of a sensor exceeding the rated voltage of the external amplifier, occurs depending on the circuit system. This causes the impact ionization phenomenon, and thus increasing the dark current nonuniformity.

Specific explanations will be given with reference to FIGS. 15 and 16.

FIG. 15 shows a constant-current circuit used for an amplifier in which an output current is determined by the voltage applied to the gate terminal of a transistor Q7 and the resistance of a resistor R3.

For example, when the voltage of the gate terminal is 2V and the resistance of the resistor R3 is 20 KΩ, a current of 100 μA is generated. A current is supplied from a common current source for a chip to a terminal IN, and the circuit shown in FIG. 15 generates a current value suitable for each circuit block. When the current input to the terminal IN is stopped in order to reduce the current of the entire chip, the total current value is reduced. However, although the gate voltage of a transistor Q12 during operation is about 3V, the gate voltage of the transistor Q12 increases to approximately 4.3V to 5V when the current from the terminal IN stops.

As a result, the amount of current flowing to the transistor Q12 increases. Thus, significant dark current nonuniformity due to an impact ionization phenomenon or the like may occur.

In addition, when a circuit shown in FIG. 16 is used for a buffer provided in the final output stage, a current is supplied from the common current for the chip to the terminal IN. The output buffer must be a high-speed and high-dynamic-range buffer.

Thus, a large current consumption and a power supply voltage of more than 5V, for example 8V, may be used. Since reduction in the current consumption of a high-speed amplifier is very effective, when the current input to the terminal IN is stopped in order to reduce the current of the entire chip, the total current value is reduced. However, the output terminal of the transistor Q12 is pulled up to a VDD side. As a result, a voltage that exceeds the rated voltage is input to the external amplifier.

SUMMARY OF THE INVENTION

The present invention provides a solid-state image device that has a structure in which an external amplifier is disposed near the solid-state image device and that is capable of reducing dark current nonuniformity caused by an internal amplifier of the solid-state image device and the external amplifier disposed near the solid-state image device and acquiring images of an excellent quality.

In order to suppress generation of dark current nonuniformity, an output unit dedicated to long-time accumulation, which requires only a small current consumption and suppresses impact ionization, is provided in addition to an output amplifier disposed inside the solid-state image device. In addition, with a structure in which the external amplifier is disposed in close vicinity to the solid-state image device, the power source of the external amplifier is turned off during the accumulation time in order to reduce dark current nonuniformity. The output unit configured to output a voltage dedicated to long-time accumulation is provided so that the external amplifier does not exceed the rated voltage.

In other words, the solid-state image device according to the present invention including pixels arranged two-dimensionally, the pixels each including a photoelectric converter configured to convert incident light into an electric signal, includes an output amplifier configured to amplify a photoelectric conversion output from each of the pixels and a reference voltage amplifier configured to output a reference voltage. The solid-state image device selectively outputs the photoelectric conversion output and the reference voltage.

In addition, a camera according to the present invention includes the solid-state image device, a lens for forming an optical image on the solid-state image device, and a diaphragm for changing the amount of light passing through the lens.

Accordingly, the current consumption of the entire solid-state image device is reduced, generation of dark current nonuniformity is suppressed, and the rated voltage of the external amplifier is not exceeded.

Further features of the present invention will become apparent from the following description of exemplary embodiments with reference to the attached drawings.

BRIEF DESCRIPTION OF THE DRAWINGS

FIG. 7 is a schematic diagram schematically showing a solid-state image device according to a seventh embodiment of the present invention.

FIG. 8 shows the relationship between an accumulation time and a driving operation in the seventh embodiment of the present invention.

FIG. 11 is a schematic diagram for explaining a known solid-state image device.

FIG. 12 is a schematic diagram for explaining the known solid-state image device.

FIG. 13 is a schematic diagram for explaining another known solid-state image device.

FIG. 14 is a schematic diagram for explaining another known solid-state image device.

FIG. 15 is a circuit diagram showing a constant-current source circuit used for an output amplifier.

FIG. 16 is a circuit diagram showing a buffer disposed in the final stage used for the output amplifier.

DESCRIPTION OF THE EMBODIMENTS

Embodiments of the present invention will be described with reference to the drawings.

First Embodiment

Figure 1:
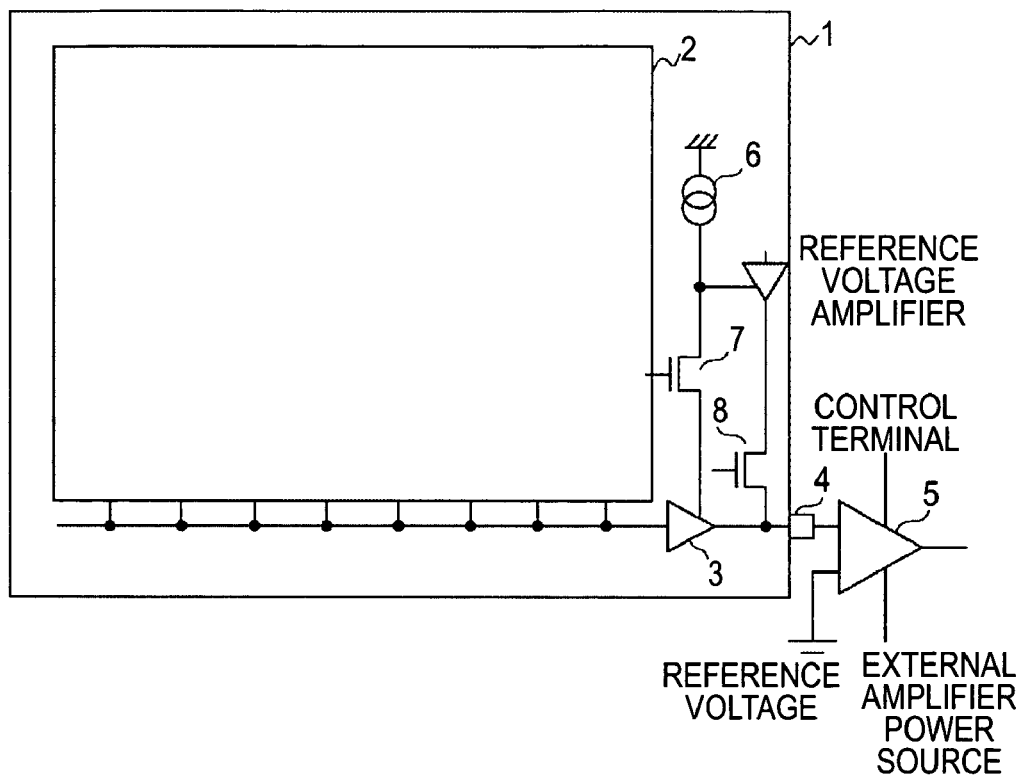
FIG. 1 is a schematic diagram schematically showing a solid-state image device according to a first embodiment of the present invention.

FIG. 1 is a schematic diagram schematically showing a solid-state image device according to a first embodiment of the present invention.

Reference numeral 1 denotes the entire solid-state image device. Pixels each including a photoelectric converter are arranged two-dimensionally in a pixel area 2. An output amplifier 3 outputs signals of the pixels. An external amplifier (provided with a control terminal) 5 is disposed near an output terminal 4. Reference numeral 6 denotes a current source of the output amplifier 3. A power-save switch 7 reduces the current consumption of the output amplifier 3. Reference numeral 8 denotes an output selection switch. These units are arranged as shown in FIG. 1.

A structure in which the external amplifier 5 is added to the solid-state image device 1 can also be referred to as a solid-state image device in terms of functionality. This is also applied to the embodiments described below.

In the first embodiment, during an accumulation time, the current consumption of the output amplifier 3 is reduced using the power-save switch 7, and an increase in the dark current of a photoelectric converter located near the output amplifier 3 is thus suppressed. In addition, in order to reduce the current consumption and dark current nonuniformity, the external amplifier 5 is set to a power-save mode using the control terminal of the external amplifier 5 provided with the control terminal during the accumulation time. The solid-state image device 1 causes a voltage equal to the reference voltage of the external amplifier 5 to be output from the output terminal 4 to the external amplifier 5 by turning on the output selection switch 8. The voltage equal to the reference voltage is generated by a reference voltage amplifier provided in the solid-state image device 1. The output amplifier 3 has a large current consumption in order to output signals of pixels at high speed. However, since the reference voltage amplifier only outputs the reference voltage and does not need to be a high-speed amplifier, the reference voltage amplifier may be designed so as to have a small current consumption. For example, the reference voltage amplifier has a current consumption about one-fifth the output amplifier 3. Thus, dark current nonuniformity due to a circuit inside the chip is reduced. In other words, dark current nonuniformity caused by the output amplifier 3 (i.e., heat generation or light emission) is prevented. In addition, the reference voltage need not be equal to the reference voltage of the external amplifier 5 as long as it is within the rated voltage of the external amplifier 5.

Figure 9:
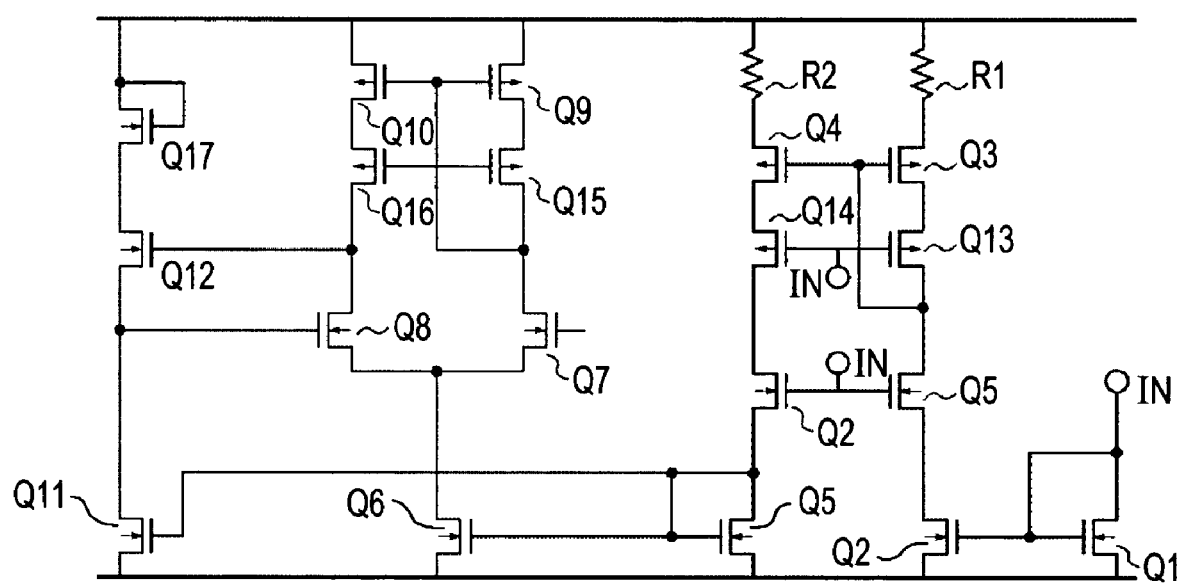
FIG. 9 is a circuit diagram of a reference voltage amplifier according to the present invention.

The dedicated reference voltage output unit (i.e., a dedicated amplifier) of the first embodiment is provided in order to reduce the nonuniformity of dark currents. Since an output amplifier must be a high-speed and high-dynamic-range amplifier, the output amplifier needs to have a large current consumption and a wide signal amplitude. In contrast, the reference voltage output unit may operate at a low speed, and a voltage to be output is a voltage at a point. Since the operation speed is slow, the current consumption can be significantly reduced compared with an output amplifier. Thus dark current nonuniformity caused by heat generation is reduced. In addition, since a wide range of output voltages is not required, a circuit for reducing the drain-gate voltage of an N-metal-oxide semiconductor (NMOS) transistor is used in order to suppress the occurrence of impact ionization. FIG. 9 depicts an example of a circuit where dark current nonuniformity can be significantly reduced. The first embodiment is not limited to the circuit shown in FIG. 9, and any circuit that would enable practice of the present invention is applicable.

In particular, for output portions (transistors Q11, Q12, and Q17), since Q17, which is an NMOS diode, is disposed on the VDD side of the transistor Q12, the drain voltage is reduced and impact ionization is suppressed instead of realizing a wide signal amplitude.

Since specifications required for the circuit are different, simply reducing or turning off the current of the output amplifier 3 cannot be substituted.

With such driving, heat generation and light emission of the output amplifier 3 can be suppressed, and heat generation of the external amplifier 5 can also be suppressed by reducing the current consumption of the external amplifier 5. Thus, generation of dark current nonuniformity can be suppressed.

Second Embodiment

Figure 2:
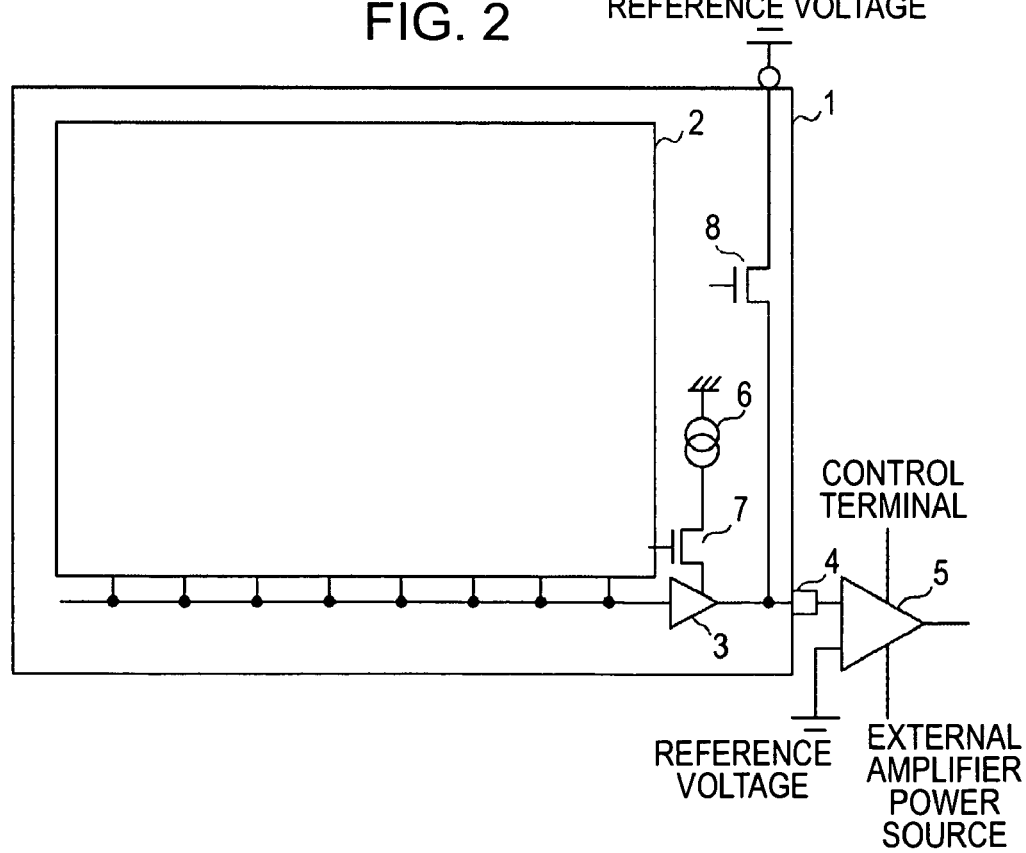
FIG. 2 is a schematic diagram schematically showing a solid-state image device according to a second embodiment of the present invention.

FIG. 2 is a schematic diagram schematically showing a solid-state image device according to a second embodiment of the present invention.

Reference numeral 1 denotes the entire solid-state image device. Pixels each including a photoelectric converter are arranged two-dimensionally in a pixel area 2. An output amplifier 3 outputs signals of the pixels. An external amplifier (provided with a control terminal) 5 is disposed near an output terminal 4. Reference numeral 6 denotes a current source of the output amplifier 3. A power-save switch 7 reduces the current consumption of the output amplifier 3. Reference numeral 8 denotes an output selection switch.

In the second embodiment, during an accumulation time, the current consumption of the output amplifier 3 is reduced using the power-save switch 7, and an increase in the dark current of a photoelectric converter located near the output amplifier 3 is thus suppressed. In addition, in order to reduce the current consumption and dark current nonuniformity, the external amplifier 5 is set to a power-save mode using the control terminal of the external amplifier 5 provided with the control terminal during the accumulation time. The output selection switch 8 causes a voltage equal to the reference voltage of the external amplifier 5 to be output from the output terminal 4 to the external amplifier 5.

In the second embodiment, the voltage equal to the reference voltage of the external amplifier 5 is supplied from outside of the solid-state image device 1.

In the second embodiment, since the reference voltage is acquired from outside, the number of pins used for connection is increased. However, smaller power consumption is required compared with a case where the reference voltage is generated inside. In addition, since the reference voltage is output in accordance with switch selection, switching can be performed quickly.

In addition, the reference voltage need not be equal to the reference voltage of the external amplifier 5 as long as it is within the rated voltage of the external amplifier 5.

With such driving, the current consumption of the external amplifier 5 can be reduced, and generation of dark current nonuniformity caused by heat generation can also be suppressed.

Third Embodiment

Figure 3:
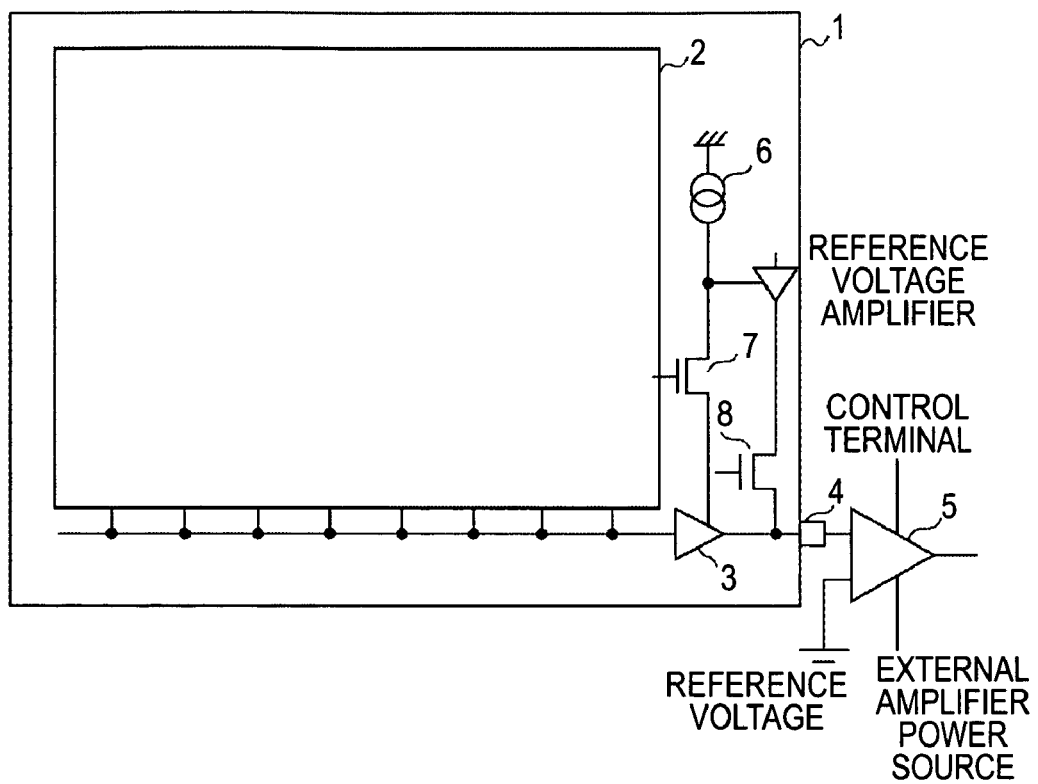
FIG. 3 is a schematic diagram schematically showing a solid-state image device according to a third embodiment of the present invention.

FIG. 3 is a schematic diagram schematically showing a solid-state image device according to a third embodiment of the present invention.

Reference numeral 1 denotes the entire solid-state image device. Pixels each including a photoelectric converter are arranged two-dimensionally in a pixel area 2. An output amplifier 3 outputs signals of the pixels. An external amplifier (provided with a control terminal) 5 is disposed near an output terminal 4. Reference numeral 6 denotes a current source of the output amplifier 3. A power-save switch 7 reduces the current consumption of the output amplifier 3. Reference numeral 8 denotes an output selection switch. These units are arranged as shown in FIG. 3.

In the third embodiment, during an accumulation time, the current consumption of the output amplifier 3 is reduced using the power-save switch 7, and an increase in the dark current of a photoelectric converter located near the output amplifier 3 is thus suppressed. In addition, in order to completely reduce dark current nonuniformity, the power source of the external amplifier 5 is turned off during the accumulation time. In the solid-state image device 1, in order not to exceed the rated voltage of the external amplifier 5 provided with the control terminal, a voltage equal to the reference voltage of the external amplifier 5 is output from a reference voltage amplifier by turning on the output selection switch 8. The voltage output from the solid-state image device 1 need not be equal to the reference voltage of the external amplifier 5 as long as it is within the rated voltage of the external amplifier 5.

The reason for turning off the power source of the external amplifier 5 provided with the control terminal is that some amount of current flows even in the power-save mode. For example, an external amplifier provided with a control terminal has a current consumption of 6.8 mA during a normal operation and has a current consumption of 0.4 mA in the power-save mode. Although the current consumption in the power-save mode is reduced to one-tenth of the current consumption for the normal operation, the influence of the dark current nonuniformity increases when image pickup for a long-time accumulation, such as more than ten seconds, is performed. Thus, the problem of dark current nonuniformity can be completely reduced by turning off the power source of the external amplifier provided with the control terminal.

With such driving, the current consumption of the external amplifier 5 can be further reduced, and generation of dark current nonuniformity caused by heat generation can also be suppressed. In addition, an output of the solid-state image device 1 does not exceed the rated voltage of the external amplifier 5 even if the power source of the external amplifier 5 is turned off.

Since the power source is not turned off in the power-save mode using the control terminal of the external amplifier 5, switching can be performed quickly. However, there are some problems in which a large integrated circuit (IC) must be used since a pin used for the control terminal must be provided in the solid-state image device 1 and in which only a small number of amplifiers can be mounted in the IC.

In contrast, an external amplifier not provided with a control terminal can be turned off by turning off a regulator that supplies a power supply voltage to the amplifier. In addition, since the external amplifier not provided with the control terminal can reduce the number of pins, a small IC can be realized, and a large number of amplifiers can be mounted in the IC.

For example, when an external amplifier provided with a control terminal is used for a solid-state image device having two output terminals, two ICs must be mounted. In contrast, when an external amplifier not provided with a control terminal is used, only one IC is mounted. For a solid-state image device with a limited mounting area, an external amplifier not provided with a control terminal for which the number of ICs can be reduced is effective.

Examples of cases where an amplifier not provided with a control terminal is mounted will be described in fourth to seventh embodiments.

Fourth Embodiment

Figure 4:
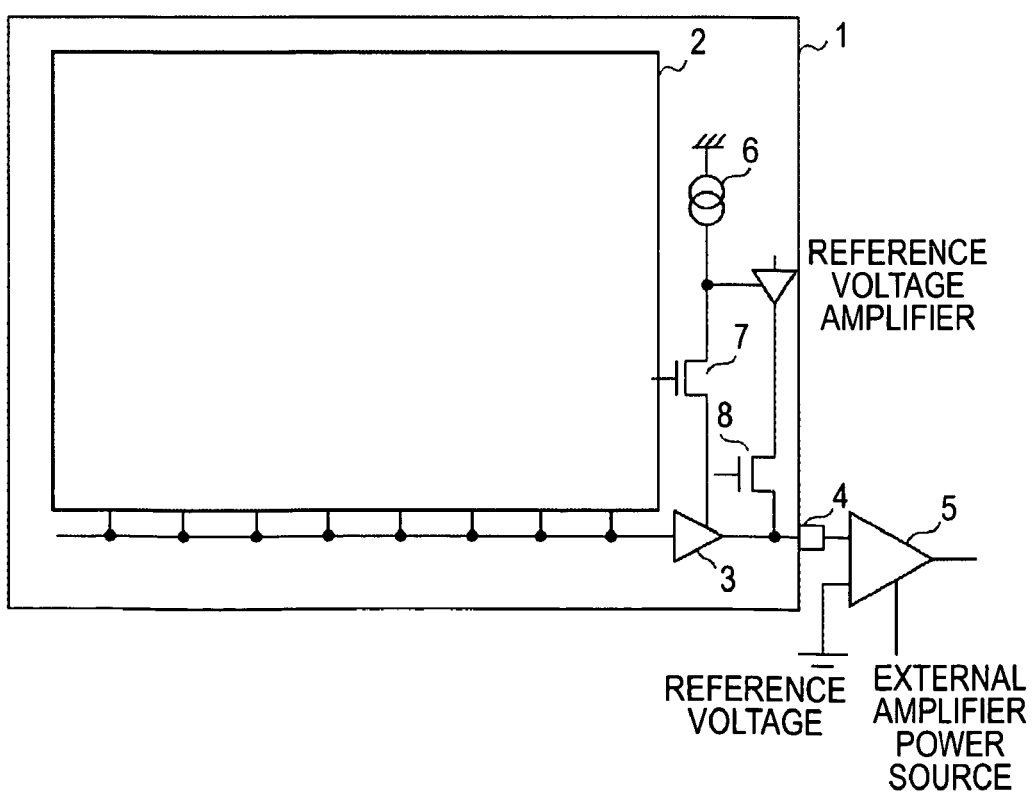
FIG. 4 is a schematic diagram schematically showing a solid-state image device according to a fourth embodiment of the present invention.

FIG. 4 is a schematic diagram schematically showing a solid-state image device according to a fourth embodiment of the present invention.

Reference numeral 1 denotes a solid-state image device. Pixels each including a photoelectric converter are arranged two-dimensionally in a pixel area 2. An output amplifier 3 outputs signals of the pixels. An external amplifier 5 is disposed near an output terminal 4. Reference numeral 6 denotes a current source of the output amplifier 3. A power-save switch 7 reduces the current consumption of the output amplifier 3. Reference numeral 8 denotes an output selection switch.

In the fourth embodiment, during an accumulation time, the current consumption of the output amplifier 3 is reduced using the power-save switch 7, and an increase in the dark current of a photoelectric converter located near the output amplifier 3 is suppressed. In addition, in order to reduce dark current nonuniformity, the power source of the external amplifier 5 is turned off during the accumulation time. In addition, the solid-state image device 1 outputs a voltage equal to the reference voltage of the external amplifier 5 by turning on the output selection switch 8 in order not to exceed the rated voltage of the external amplifier 5. This voltage is generated by a reference voltage amplifier. This voltage need not be equal to the reference voltage of the external amplifier 5 as long as it is within the rated voltage of the external amplifier 5.

With such driving, the current consumption of the external amplifier 5 can be reduced, and generation of dark current nonuniformity caused by heat generation can also be suppressed. In addition, an output of the solid-state image device 1 does not exceed the rated voltage of the external amplifier 5 even if the power source of the external amplifier 5 is turned off.

Fifth Embodiment

Figure 5:
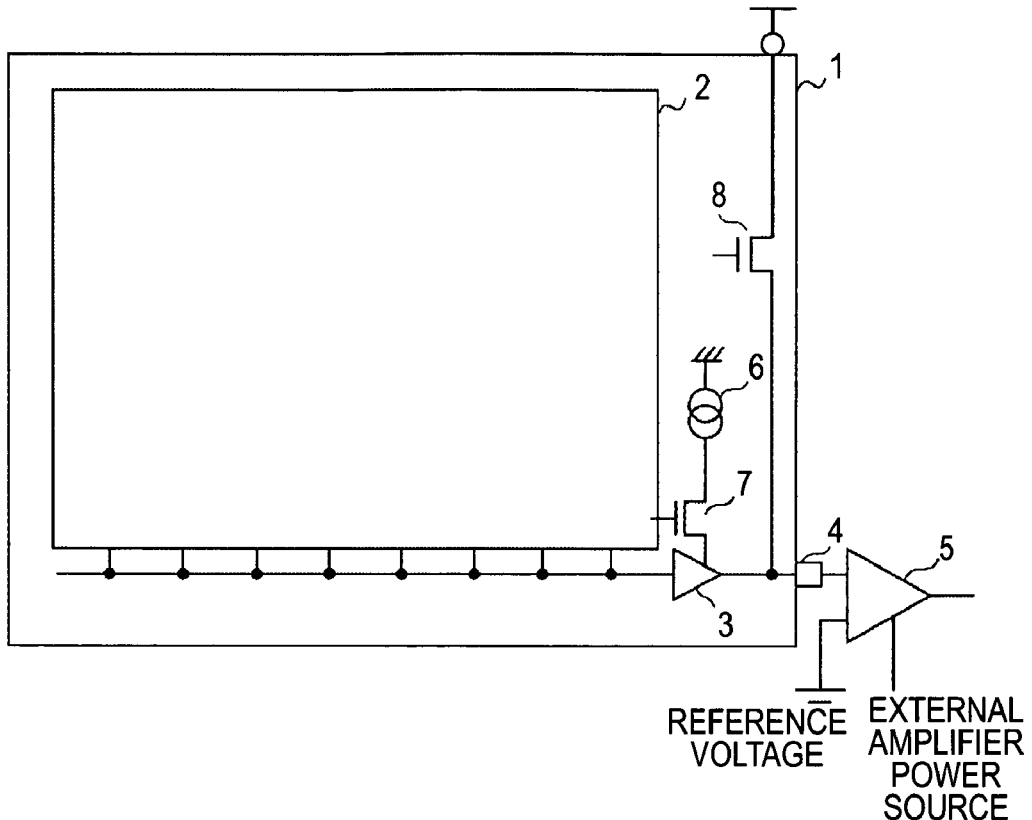
FIG. 5 is a schematic diagram schematically showing a solid-state image device according to a fifth embodiment of the present invention.

FIG. 5 is a schematic diagram schematically showing a solid-state image device according to a fifth embodiment of the present invention.

Reference numeral 1 denotes a solid-state image device. Pixels each including a photoelectric converter are arranged two-dimensionally in a pixel area 2. An output amplifier 3 outputs signals of the pixels. An external amplifier 5 is disposed near an output terminal 4. Reference numeral 6 denotes a current source of the output amplifier 3. A power-save switch 7 reduces the current consumption of the output amplifier 3. Reference numeral 8 denotes an output selection switch.

In the fifth embodiment, during an accumulation time, the current consumption of the output amplifier 3 is reduced using the power-save switch 7. In addition, in order to reduce dark current nonuniformity, the power source of the external amplifier 5 is turned off during the accumulation time. In addition, the solid-state image device 1 outputs a voltage equal to the reference voltage of the external amplifier 5 by turning on the output selection switch 8 in order not to exceed the rated voltage of the external amplifier 5. In the fifth embodiment, the voltage equal to the reference voltage of the external amplifier 5 is supplied from outside the solid-state image device 1.

In this case, since the reference voltage is acquired from outside, the number of pins is increased. However, a smaller power consumption is required compared with a case where the reference voltage is generated inside. In addition, since the reference voltage is output in accordance with switch selection, switching can be performed quickly.

In addition, the voltage output from the solid-state image device 1 need not be equal to the reference voltage of the external amplifier 5 as long as it is within the rated voltage of the external amplifier 5.

With such driving, the current consumption of the external amplifier 5 can be reduced, and generation of dark current nonuniformity caused by heat generation can also be suppressed. In addition, an output of the solid-state image device 1 does not exceed the rated voltage of the external amplifier 5 even if the power source of the external amplifier 5 is turned off.

Sixth Embodiment

Figure 6:
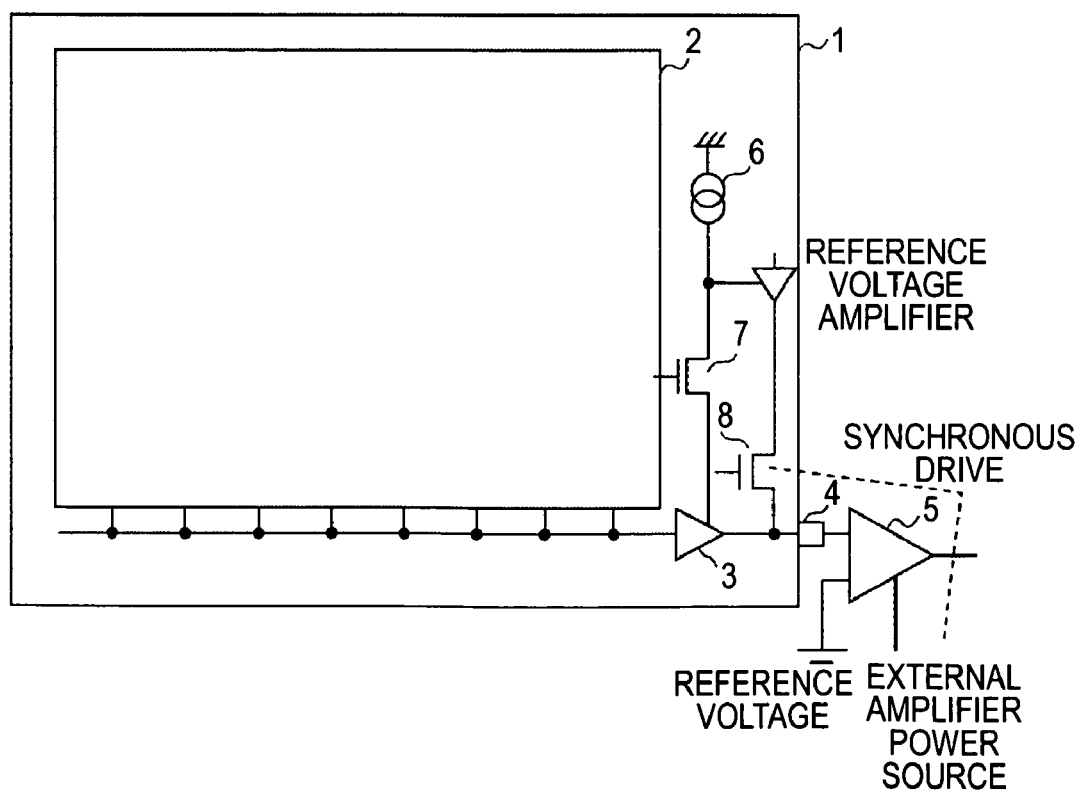
FIG. 6 is a schematic diagram schematically showing a solid-state image device according to a sixth embodiment of the present invention.

FIG. 6 is a schematic diagram schematically showing a solid-state image device according to a sixth embodiment of the present invention.

A structure according to the sixth embodiment is similar to the structure according to the first embodiment with the exception that turning off of the power source of the external amplifier 5 is associated with switch selection of the output selection switch 8 of the solid-state image device 1.

In the sixth embodiment, during an accumulation time, the current consumption of the output amplifier 3 is reduced using the power-save switch 7. In addition, in order to reduce dark current nonuniformity, the power source of the external amplifier 5 is turned off during the accumulation time. By performing switch selection of the output selection switch 8 in association with turning off of the external amplifier 5, the solid-state image device 1 causes a voltage equal to the reference voltage of the external amplifier 5 to be output from a reference voltage amplifier.

With such driving, the current consumption of the external amplifier 5 can be reduced, and generation of dark current nonuniformity caused by heat generation can also be suppressed. In addition, an output of the solid-state image device 1 is automatically controlled so as not to exceed the rated voltage of the external amplifier 5.

Seventh Embodiment

FIG. 7 is a schematic diagram schematically showing a solid-state image device according to a seventh embodiment of the present invention.

Reference numeral 1 denotes a solid-state image device. Pixels each including a photoelectric converter are arranged two-dimensionally in a pixel area 2. An output amplifier 3 outputs signals of the pixels. An external amplifier 5 is disposed near an output terminal 4. Reference numeral 6 denotes a current source of the output amplifier 3. A power-save switch 7 reduces the current consumption of the output amplifier 3. Reference numeral 8 denotes an output selection switch. A second power-save switch 9 reduces the current consumption of a reference voltage amplifier.

The seventh embodiment is characterized in that the power source of the external amplifier 5, the output selection switch 8, the power-save switch 7, and the second power-save switch 9 operate in association with each other.

The seventh embodiment will be described in more detail with reference to FIGS. 7 and 8.

For an accumulation time of about one second, operations of "power-save mode 1" are performed, as described below. The power-save switch 7 is turned off, and the current consumption of the output amplifier 3 (since signals of pixels are output at a high speed, a large current consumption is required) is reduced. In addition, the solid-state image device 1 turns on the output selection switch 8, and outputs a voltage equal to the reference voltage of the external amplifier 5. At this time, the power source of the external amplifier 5 is turned off. The foregoing operations are performed in association with each other.

For an accumulation time of about five seconds, operations of "power-save mode 2" are performed, as described below. The power-save switch 7 is turned off, and the current consumption of the output amplifier 3 is reduced. In addition, the second power-save switch 9 is turned off, and the current consumption of the reference voltage amplifier (since only the reference voltage is output, a small current consumption, which is about one-fifth of the current consumption of the output amplifier 3, is required) is reduced. In addition, the output selection switch 8 is turned on, and the solid-state image device 1 outputs a voltage equal to the reference voltage of the external amplifier 5. At this time, the power source of the external amplifier 5 is turned off. The foregoing operations are performed in association with each other.

For an accumulation time of more than ten seconds, operations of "power-save mode 3" are performed, as described below. The power-save switch 7 is turned off, and the second power-save switch 9 is also turned off. In addition, the power source of the current source 6 is turned off, and the output selection switch 8 is turned on. The solid-state image device 1 outputs a voltage equal to the reference voltage of the external amplifier 5. At this time, the power source of the external amplifier 5 is turned off. The foregoing operations are performed in association with each other. After turning off the power source of the current source 6, a certain amount of time is required for rising. Thus, by about one second before the end of the accumulation time, the power source of the current source 6, the power source of the external amplifier 5, and the power-save switch 7 are turned on and the output selection switch 8 is turned off, so that the output amplifier 3 is operated.

With such driving, generation of dark current nonuniformity caused by heat generation of the external amplifier 5 can be suppressed. In addition, an output of the solid-state image device 1 is automatically controlled so as not to exceed the rated voltage of the external amplifier 5. In addition, the current consumption of the solid-state image device 1 can be reduced.

A case where the solid-state image device according to each of the first to seventh embodiments is used for a still video camera will be described with reference to FIG. 10.

Figure 10:
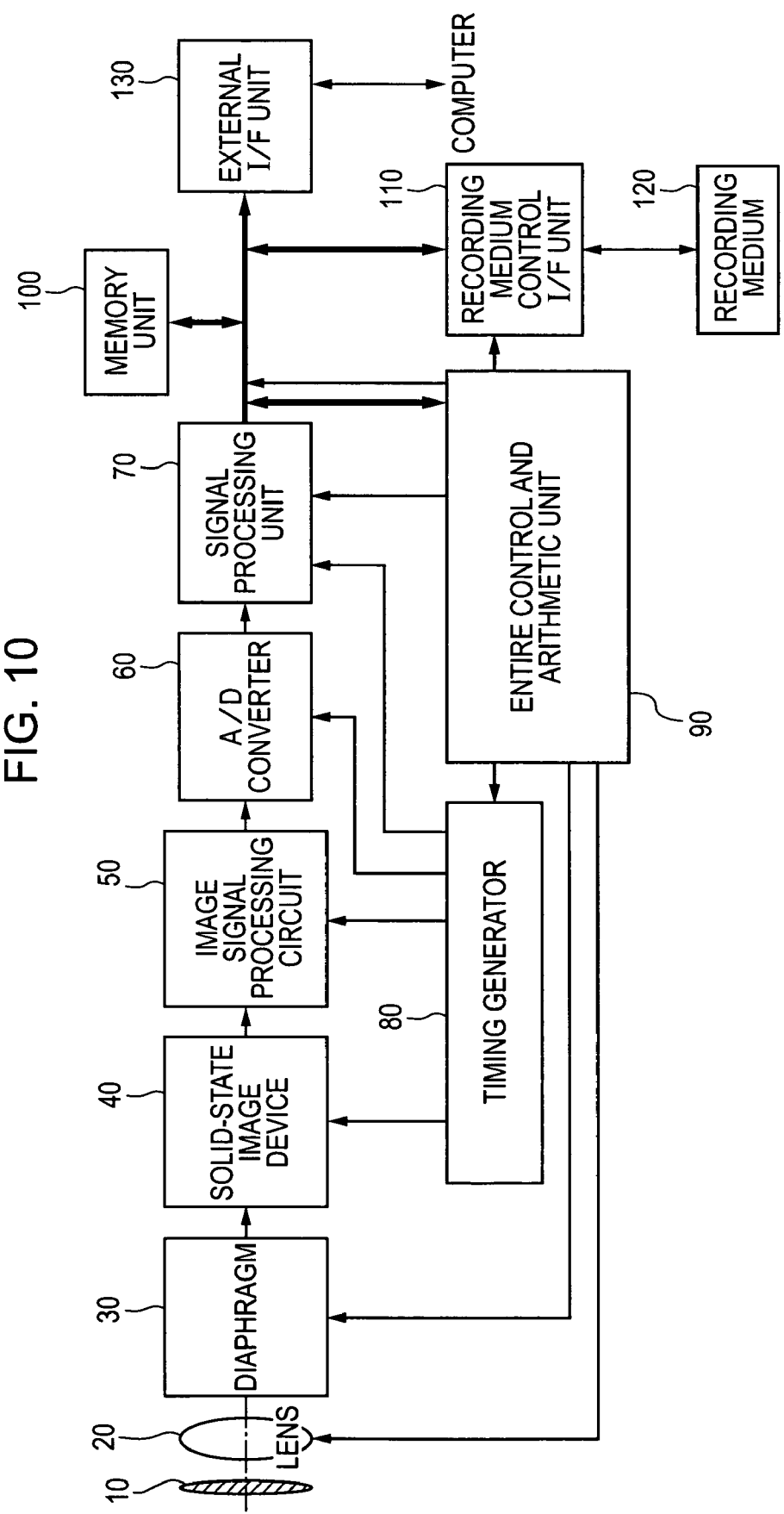
FIG. 10 is a block diagram showing an example of the structure of a still video camera.

FIG. 10 is a block diagram showing a case where a solid-state image device according to the present invention is used for a still video camera. A solid-state image device 40 corresponds to the solid-state image device 1 and the external amplifier 5 according to the present invention shown, for example, in FIG. 1.

Referring to FIG. 10, a barrier 10 functions both as a protector of a lens 20 and a main switch. The lens 20 forms an optical image of an object on the solid-state image device 40. A diaphragm 30 changes the amount of light passing through the lens 20. The solid-state image device 40 captures the object whose image is formed by the lens 20 as an image signal. An analog-to-digital (A/D) converter 60 performs analog-to-digital conversion on the image signal output from the solid-state image device 40. A signal processing unit 70 performs correction and compression of image data output from the A/D converter 60. A timing generator 80 outputs various timing signals to the solid-state image device 40, an image signal processing circuit 50, the A/D converter 60, and the signal processing unit 70. An entire control and arithmetic unit 90 performs various arithmetic operations and controls the entire still video camera. A memory unit 100 temporarily stores image data. A recording medium control interface unit 110 performs recording to or reading from a recording medium 120. The detachable recording medium 120 is, for example, a semiconductor memory for recording or reading image data. An external interface 130 communicates with an external computer or the like.

The operation of the still video camera having the foregoing structure for photographing is described next.

When the barrier 10 is opened, the main power source is turned on. Then, the power source of a control system is turned on, and the power source of an image system circuit, such as the A/D converter 60, is turned on.

Then, in order to control the light exposure, the entire control and arithmetic unit 90 opens the diaphragm 30. A signal output from the solid-state image device 40 is converted by the A/D converter 60, and the converted signal is input to the signal processing unit 70.

The entire control and arithmetic unit 90 performs an arithmetic operation of exposure in accordance with the data. The entire control and arithmetic unit 90 controls the diaphragm 30 in accordance with the brightness determined from the photometry.

Then, in accordance with the signal output from the solid-state image device 40, the entire control and arithmetic unit 90 extracts high-frequency components, and calculates the distance to the object. Then, the lens 20 is driven, and it is determined whether or not focusing is achieved. If it is determined that focusing is not achieved, the lens 20 is re-driven, and focusing detection operation is performed. Then, after focusing is confirmed, real exposure starts.

After exposure, the image signal output from the solid-state image device 40 is analog-to-digitally converted by the A/D converter 60, and written to the memory unit 100 by the entire control and arithmetic unit 90 via the signal processing unit 70.

Then, data accumulated in the memory unit 100 is recorded in the detachable recording medium 120, such as a semiconductor memory, via the recording medium control interface unit 110 under the control of the entire control and arithmetic unit 90. In addition, an image may be directly input to a computer or the like via the external interface 130 and may be processed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-335400 filed Nov. 19, 2004, which is hereby incorporated by reference herein in its entirety.

What is claimed is:

1. A solid-state image device including pixels arranged two-dimensionally, the pixels each including a photoelectric converter for converting incident light into an electric signal, the solid-state image device comprising:
   an output amplifier configured to amplify a photoelectric conversion output from each of the pixels; and
   a reference voltage amplifier configured to output a reference voltage, wherein the
   solid-state image device selectively outputs the photoelectric conversion output and the reference voltage,
   wherein the reference voltage output from the reference voltage amplifier is output without passing through the output amplifier, and
   wherein the reference voltage is output during an accumulation period of the pixels.

2. The solid-state image device according to claim 1, wherein an output terminal of the solid-state image device is connected to an external amplifier.

3. The solid-state image device according to claim 2, wherein the reference voltage output from the solid-state image device is substantially equal to a voltage input from an outside of the solid-state image device to the external amplifier.

4. The solid-state image device according to claim 2, wherein the solid-state image device outputs the reference voltage at least when a power source of the external amplifier is turned off.

5. The solid-state image device according to claim 4, wherein:
   the solid-state image device has a function to control a current consumption; and
   the function and turning on or turning off of the power source of the external amplifier are controlled in association with each other.

6. A camera comprising:
   the solid-state image device as set forth in claim 1;
   a lens for forming an optical image on the solid-state image device; and
   a diaphragm for changing the amount of light passing through the lens.

7. The solid-state image device according to claim 2, wherein the reference voltage is within a range of rated voltage of the external amplifier.

* * * * *